United States Patent [19]

Duncan

[11] 4,362,419

[45] Dec. 7, 1982

[54] COUPLINGS

[75] Inventor: William C. W. Duncan, Bugbrooke, England

[73] Assignee: Plessey Overseas Limited, Ilford, England

[21] Appl. No.: 172,686

[22] Filed: Jul. 28, 1980

[51] Int. Cl.³ .............................................. F16B 7/18
[52] U.S. Cl. .................................... 403/343; 403/349
[58] Field of Search ............... 411/307, 312, 411, 417; 403/349, 348, 343

[56] References Cited

U.S. PATENT DOCUMENTS

| 571,067 | 11/1896 | Ebert | 411/312 |
| 2,324,731 | 7/1943 | Simmonds | 411/312 |
| 2,387,682 | 10/1945 | Richey | 403/349 X |

FOREIGN PATENT DOCUMENTS 2204775 of 0000 France .
17075 of 0000 United Kingdom .
1111940 of 0000 United Kingdom .
1394317 of 0000 United Kingdom .

OTHER PUBLICATIONS

Machine Design, vol. 34, Feb. 1, 1962, p. 152, Description of Tapping Screw.

Primary Examiner—Andrew V. Kundrat
Attorney, Agent, or Firm—Fleit & Jacobson

[57] ABSTRACT

The invention relates to a quickly detachable self locking coupling which is simpler and cheaper to produce than other self locking couplings such as bayonet couplings and couplings using separate spring loaded ratchet devices or interference fits. The coupling comprises male and female screw threaded bodies, the thread on the male body having a step along its length, and the thread inside the female body consisting of only one turn of 360 degrees with flat ends. The parts are screwed together until the end of the thread in the female body rides over the step in the thread of the male body. A rubber ring then urges the threads together so that inadvertent unscrewing of the bodies is inhibited.

5 Claims, 3 Drawing Figures

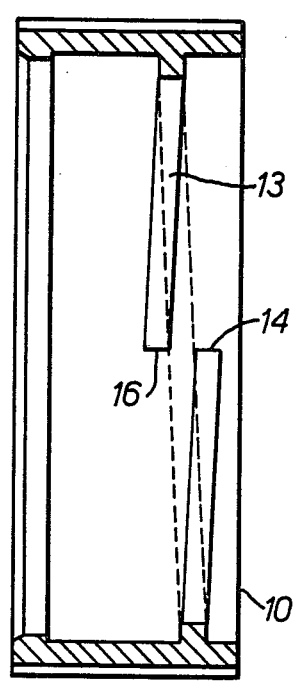
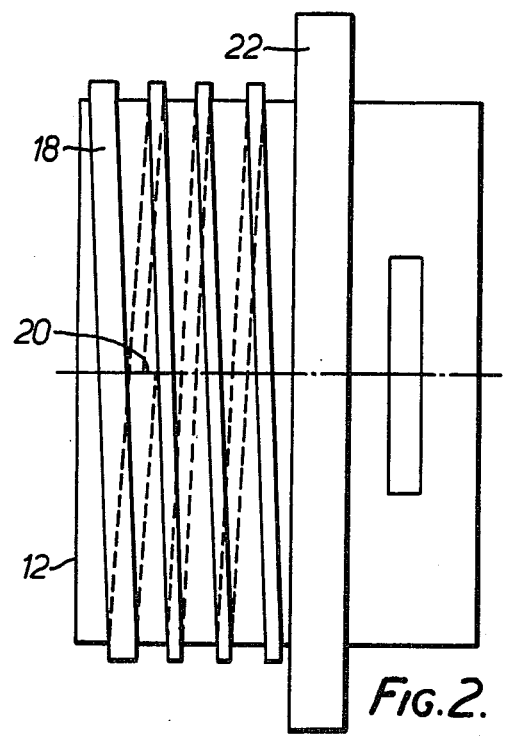
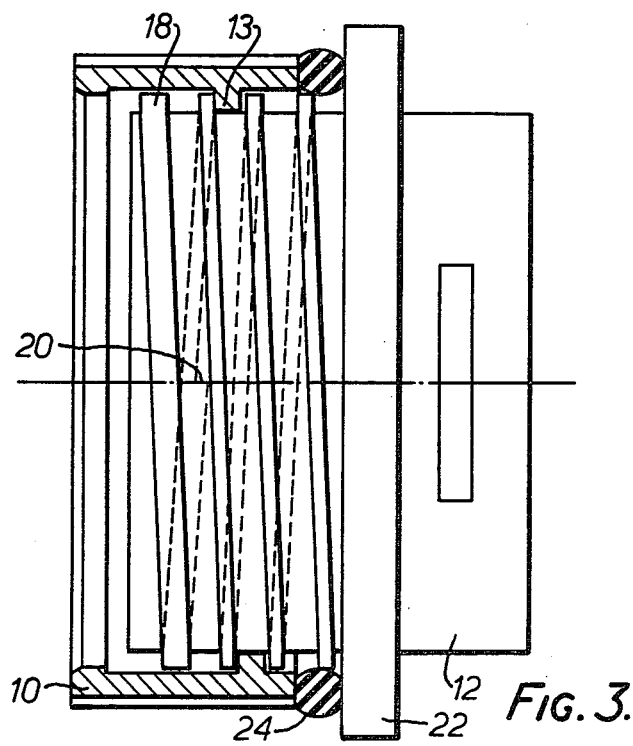

COUPLINGS

IMPROVEMENTS IN OR RELATING TO COUPLINGS

This invention relates to couplings and more particularly to couplings which can be readily connected and disconnected and include means for locking the coupling to prevent inadvertent disconnection thereof.

Examples of such couplings are bayonet type couplings and systems using spring loaded ratchet devices and interference fits.

It is an object of the present invention to provide a coupling which is simpler and cheaper to produce than previously known couplings.

According to the present invention a coupling comprises two cylindrical bodies, one having an external screw thread and the other having a mating internal screw thread, each screw thread being provided with a deformed portion, resilient means being located between the two bodies such that, when the screw threads are mated and are relatively rotated against the resilient means, the deformed portions engage, and opposite relative rotation between the screw threads is inhibited.

The deformed portions may take the form of a recess in one of the screw threads and a shaped portion adapted to engage the recess in the other screw thread.

Preferably, the external screw thread is provided with a step intermediate of its ends.

The internal screw thread preferably comprises one complete pitch of thread only, the end of the thread being adapted to engage the step in the external screw thread after a predetermined amount of relative rotation between the screw threads.

Preferably, the resilient means comprises a resilient ring located between the two bodies.

An embodiment of the invention will now be described by way of example only with reference to the accompanying drawings in which:

FIG. 1 is a cross-sectional view of one body part of a coupling according to the present invention, FIG. 2 is a side view of another body part of the coupling, and, FIG. 3 is a cross-sectional view of the assembled coupling.

The coupling comprises basically two body parts 10 and 12. The body part 10 is a hollow cylinder with one complete pitch of internal screw thread 13 only, i.e. extending over only 360°. The thread is of square section and the ends 14 and 16 finish abruptly with flat ends. The exterior of the body part 10 is formed with a series of flats so that a suitable tool such as a spanner can be used to rotate the body part 10.

The body part 12 also consists of a hollow cylinder, this time with an external screw thread 18, also of square section and adapted to mate with the thread 13 in the body part 10. The axial width of the square section thread 18 however is not constant, but changes abruptly at a step 20 (shown in broken lines in FIG. 2) to a narrower section a portion of the way along the thread. A flange 22 is formed on the outer surface of the body part 12.

To secure the two body parts together a rubber ring 24 is fitted over the body part 12 until it abuts the flange 22 and the body part 10 is fitted over the thread 18 and rotated so that the threads 13 and 18 mate. As the part 10 is rotated the rubber ring 24 is compressed and after a predetermined number of rotations the end 16 of the screw thread 13 rides over the step 20 formed in the thread 18. It will be seen that the action of the rubber ring 24 urges the part 10 away from the flange 22 and the screw thread 13 is thus forced into contact with the right-hand side of the narrower part of the screw thread 18. The body part 10 cannot then be rotated in the opposite direction since the end 16 of the screw thread 13 contacts the step 20 and the body parts are effectively locked together.

Releasing the body part 10 involves compressing the rubber ring 24 by pressing the parts 10 and 12 together until the end 16 of the screw thread 13 can ride over the step 20. The body part 10 can then be unscrewed in a conventional manner.

The body parts 10 and 12 may be formed from plastics material complete with the screw threads and thus can be made simply and cheaply by injection moulding.

The rubber ring 24 also acts to seal the coupling but a metal spring or other resilient material could be used.

The length of the thread 13 and the position of the step 20 may be varied to give the required locking force. Furthermore, the step 20 and the end 16 of the thread 13 can be changed to suitable mating shapes.

What we claim is:

1. A coupling comprising:

first and second hollow cylindrical bodies, said first body having a helical rib of rectangular cross-section formed on its external surface, and said second body having a helical rib of rectangular cross-section formed on its internal surface, said helical ribs being adapted to mate on relative rotation in one direction between said first and second bodies, said helical rib of said first body having a helical portion which is reduced in width from a position intermediate of its ends whereby when said helical rib in said second body passes into engagement with said rib portion of reduced width a limited degree of relative axial movement is provided between said first and said second bodies; and resilient means for urging said first and said second bodies relatively axially so that one side of said helical rib of said first body is urged into contact with one side of said helical rib of said second body, the position at which said helical rib of said first body reduces in width having a step whereby the end of said helical rib of said second body engages said step and relative rotation between said first and said second bodies is prevented in the direction to separate said two bodies.

2. A coupling as claimed in claim 1, in which said helical rib of said second body extends through 360° only, said end of said helical rib of said second body being adapted to engage said step in said helical rib of said first body after 360° of relative rotation between said two bodies.

3. A coupling as claimed in claim 1 or claim 2 wherein said resilient means is positioned so as to exert no force acting between said first and said second bodies when said bodies initially mate with each other and to act on at least one of said first and said second bodies when said helical rib of said second body engages said step.

4. A coupling as claimed in claim 1 in which the resilient means comprises a resilient ring located between the two bodies.

5. A coupling as claimed in claim 4 in which the resilient ring is made of rubber.

* * * * *